United States Patent [19]

Martin et al.

[11] 4,032,710
[45] June 28, 1977

[54] WORD BOUNDARY DETECTOR FOR SPEECH RECOGNITION EQUIPMENT

[75] Inventors: Thomas B. Martin, Delran; Marvin B. Herscher, Cherry Hill; Robert B. Cox, Cinnaminson, all of N.J.

[73] Assignee: Threshold Technology, Inc., Delran, N.J.

[22] Filed: Mar. 10, 1975

[21] Appl. No.: 556,633

[52] U.S. Cl. .............................. 179/1 SA; 179/1 SC; 179/1 SD

[51] Int. Cl.² ........................................... G10L 1/00

[58] Field of Search ............ 179/1 SA, 1 SD, 1 SE, 179/1 SC

[56] References Cited

UNITED STATES PATENTS

| | | | |
|---|---|---|---|
| 3,225,141 | 12/1965 | Dersch | 179/1 SE |
| 3,265,814 | 8/1966 | Maeda | 179/1 SE |
| 3,588,363 | 6/1971 | Herscher | 179/1 SD |
| 3,592,969 | 7/1971 | Yoshino | 179/1 SA |
| 3,679,830 | 7/1972 | Uffelman | 179/1 SD |
| 3,755,627 | 8/1973 | Berkowitz | 179/1 SD |
| 3,883,850 | 5/1975 | Martin | 179/1 SA |

OTHER PUBLICATIONS

Clapper, G. L. "Interlocks for Connected Word Recognition System," IBM Tech. Disclosure Bulletin, Aug. 1970.

Primary Examiner—William C. Cooper
Assistant Examiner—E. S. Kemeny
Attorney, Agent, or Firm—Martin Novack

[57] ABSTRACT

The present invention pertains to an apparatus which receives acoustic input, the input including words spoken in isolation, finds the word boundary instants at which a word begins and ends, and performs recognition functions on the words. A feature of the invention is the compensation for breath noise after the true end of a word, using a variable backup of the estimated word end. The apparatus includes means for generating feature signals indicative of feature characteristics in the received input and further includes means for comparing the feature signals which occurred during determined time boundaries with stored features corresponding to words in a vocabulary. The invention is directed to an improved system for detecting word boundaries which includes a means responsive to the input for generating a first feature signal indicative of the substantially continuing presence of speech-like sounds which meet a first selection criterion. Means are provided for storing the feature signals which occur during the presence of this first feature signal. Further means, responsive to the input, are provided for generating a second feature signal indicative of the presence of speech-like sounds which meet a second selection criterion, this second selection criterion being more restrictive than the first selection criterion. Means are also provided for determining the last occurrence of the second feature signal among the stored feature signals. The end boundary of an input spoken word is determined as a function of this last occurrence.

11 Claims, 12 Drawing Figures

PRIOR ART

WORD BOUNDARY DETECTOR FOR SPEECH RECOGNITION EQUIPMENT

BACKGROUND OF THE INVENTION

This invention relates to speech recognition and, more particularly, to an improved word boundary detector for an "isolated" word speech recognition system.

There have been previously developed various equipments that attempt to recognize limited vocabularies of spoken words by analysis of acoustic events. Typically, such equipments are envisioned as being useful in "voice command" applications wherein, upon recognizing particular words, the equipment produces electrical signals which control the operation of a companion system. For example, a voice command could be used to control a conveyor belt to move in a specified manner or may control a computer to perform specified calculations.

Previous efforts to develop automatic methods of speech recognition have had limited success and have led to the realization to the exceedingly complex nature of speech communication. Normal speech has a high information content with considerable variability from speaker to speaker and some variability even in the same word when spoken by the same individual. Therefore, a "perfect" recognition scheme is unattainable since the nature of the speech signal to be recognized cannot be precisely defined. As a result, the preferred schemes have been empirical approaches which have yielded at least a reasonable level of confidence, from a statistical standpoint, that a particular spoken word corresponded to a selected one of a limited machine vocabulary. The desirability of such schemes are thus not determinable by theoretical examination, but rather by a straightforward measure of recognition accuracy over an extended period of operation.

In the copending application Ser. No. 531,543, filed Dec. 11, 1974, and assigned to the same assignee as the present application, there is disclosed an apparatus which receives spoken input "training" words and a subsequent spoken input "command" word and generates a correlation function that is indicative of the resemblance of the command word to each training word. A feature extraction means processes received input words and generates digital feature output signals on particular ones of a number of feature output lines, the particular ones depending on the characteristic features of the word being spoken. The status of the feature signals which occur during each training word are stored as a normalized time dependent matrix. Subsequently, the status of the feature signals which occur during a command word are also stored as a normalized time dependent matrix. The command word matrix is compared, member by member, with each training word matrix and a correlation figure is generated for each comparison. If a sufficently high correlation is found between the command word matrix and a particular training word matrix, the command word is deemed to correspond to the particular training word. This type of system has found important application where command words are spoken in "isolation"; i.e., where there are discernable pauses between words, the pauses defining the word boundaries. (As used herein, reference to a word spoken in isolation is intended to include a short phrase meant to be uttered without a substantial pause.) In general terms, apparatus of this type includes circuitry which senses the onset of speech-like sounds and then senses the next substantial absence of speech-like sounds. These occurrences are considered the boundaries of a word and the speech feature events which occur between these boundaries are used to form the matrix referred to above. Since the matrix is correlated, member-by-member with a time dependent training word matrix, it will be apparent that the accuracy of the word boundary determination is critical if accurate speech recognition is to be attained. For example, even in cases where the command word matrix has a feature pattern that corresponds closely with a certain training word matrix feature pattern, the correlation process may not reveal the true level of coincidence if the command word matrix includes extraneous "features" in its initial or terminal columns due to incorrect word boundary determination. Also, incorrect time normalization of the command word matrix can be another unfortunate consequence of incorrect boundary determination.

The type of system described in the above-reference application has been employed with success in various commercial applications, but problems with word boundary determination have been a limiting factor on recognition accuracy. It is found that under continuous and long working conditions operators have difficulty uttering command words in true isolation, so the pause between adjacent words shrinks and renders word boundary determination difficult from the onset. Adding to the problem is the presence of interfering acoustical sounds and background noise in the user environment. If the word recognition equipment employs a high quality wide-ranging microphone as its input, the microphone will naturally pick up extraneous sounds and other background noise from within the immediate vicinity of the user. One solution to this problem might be to reduce interfering sounds by placing the operator/user in an acoustically shielded environment. However, the restrictions resulting from an acoustic enclosure are generally such that the mobility of the individual user is reduced, thereby restricting his ability to perform other functions. Since practical speech recognition equipments are largely justifiable on the basis of their allowing users to perform multiple functions (e.g., by replacing necessary push-button or writing inputs with voice command inputs), the restriction of the individual's mobility can tend to defeat the purpose of the equipment.

A more viable method of reducing interfering sounds is to eliminate noise at the microphone itself by utilizing a close-talking noise-canceling microphone as the equipment input. Thus, in practical applications close-talking noise-canceling microphones are typically worn on a lightweight headband and reasonably good results are obtained. However, for reasons heretofore unclear, it has been found that the user of a close-talking noise-canceling microphone aggravates the word boundary determination problem.

It is an object of this invention to provide solutions to the prior art problems as set forth.

SUMMARY OF THE INVENTION

Applicants have discovered that the use of a close-talking noise-cancelling microphone in a speech recognition equipment tends to introduce extraneous signals caused by breath noise. The deleterious effects of breath noise on boundary determination are found to be particularly prevalent when an individual operator is tired or when he is performing significant physical activity simultaneously with speech. A strong tendency exists to exhale at the end of isolated words and to inhale at the beginning. Inhaling produces little significant direct air blast on a close-talking microphone, whereas exhaling can produce signal levels in a microphone comparable to speech levels.

Prior art word boundary detectors generally include a rough speech presence indicator, such as an energy threshold detector, and are typically provided with some inherent hysteresis; i.e., the rough speech detector does not turn "off" until it senses that there has been no speech-like sound for at least some predetermined time, for example 100 milliseconds. This technique is necessary because many words naturally include pauses of substantial duration. Absent the hysteresis, the word boundary detector would interpret the first part of the word as an entire word. However, the presence of the hysteresis gives rise to a requirement that successive input words be separated by at least the predetermined time, lest they be interpreted as a single word. To account for the presence of hysteresis in a word boundary detector, prior art speech recognition equipments are adapted to "back up" by a fixed amount (which corresponds to the hysteresis lag time) to find the true end of the word; this typically being done by storing all of the received features and discarding the ones which occur during the fixed "backup" period. One could speculate that the detrimental effect of breath noise at the end of a word could be compensated for by increasing the "back-up" by a further fixed amount from the tentative initial word boundary. This solution is not adequate, however, since the duration of breath noise is found to be variable and, of course, if there is no breath noise the additional back-up would introduce an inaccuracy. In accordance with the present invention, applicants employ means for distinguishing between speech and breath noise, regardless of the duration and magnitude of the breath noise. An effective "back-up" of variable duration is then employed, depending on the duration of the breath noise.

The present invention pertains to an apparatus which receives acoustic input, the input including words spoken in isolation, and performs recognition functions on the words. The apparatus includes means for generating feature signals indicative of feature characteristics in the received input and further includes means for comparing the feature signals which occurred during determined time boundaries with stored features corresponding to words in a vocabulary. The invention is directed to an improved system for detecting word boundaries which includes a means responsive to the input for generating a first feature signal (e.g. average speech energy above a threshold) indicative of the substantially continuing presence of speech-like sounds which meet a first selection criterion. Means are provided for storing the feature signals (e.g. phoneme indications) which occur during the presence of this first feature signal. Further means, responsive to the input, are provided for generating a second feature signal indicative of the presence of speechlike sounds which meet a second selection criterion e.g. indicative of the presence of a voiced phonetic characteristic or an unvoiced noise-like consonant characteristic in the input), this second criterion being more restrictive than the first selection criterion. Means are also provided for determining the substantially last occurrence of the second feature signal among the stored feature signals. The end boundary of an input spoken word is determined as a function of this last occurrence. The start boundary may be determined as a function of the first feature signal.

In a preferred embodiment of the invention, the second feature signal is active when either a voiced phoneme or an unvoiced noise-like consonant is present in the input.

Further features and advantages of the invention will become more readily apparent from the following detailed description when taken in conjunction with the accompanying drawings.

DESCRIPTION OF THE PREFERRED EMBODIMENT

Figure 1:
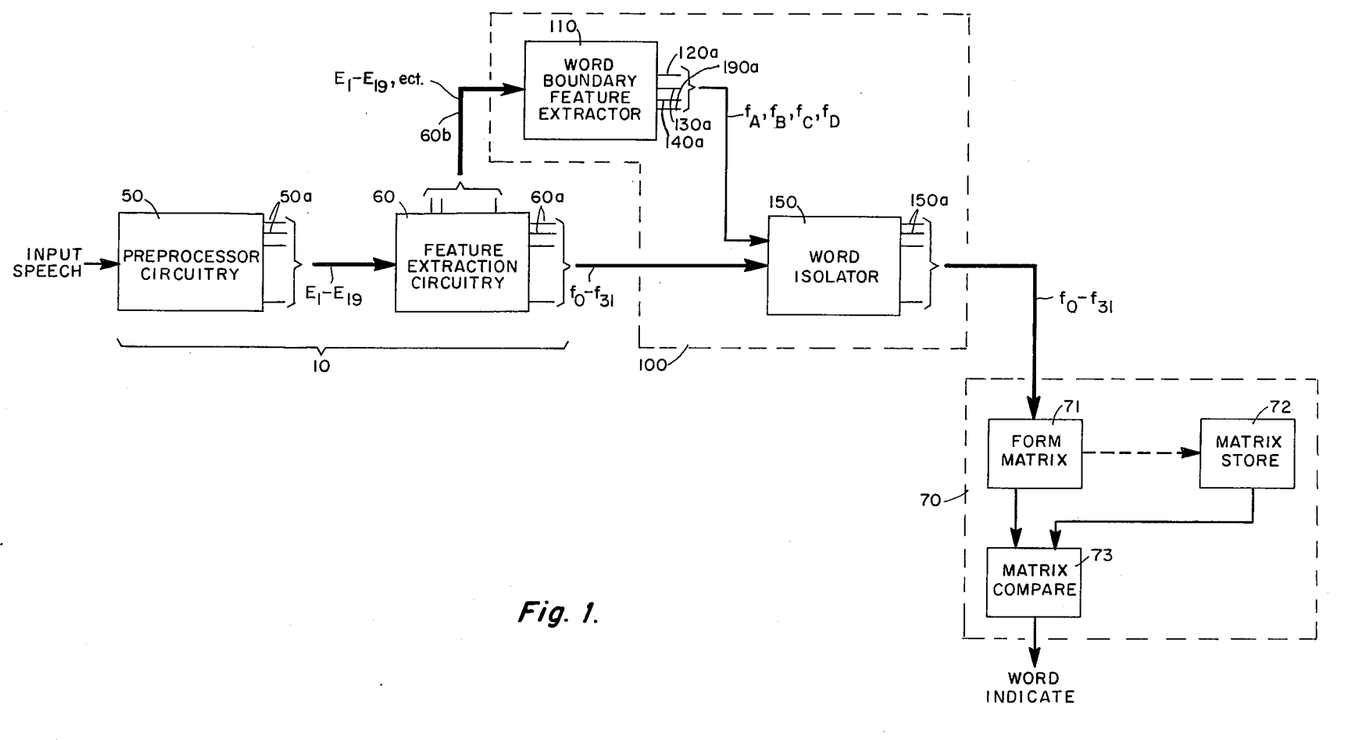
FIG. 1 is a block diagram of an apparatus in accordance with an embodiment of the invention.

Referring to FIG. 1, there is shown a simplified functional block diagram of an apparatus in accordance with the invention. Input spoken words are received by a feature extraction means 10 which comprises preprocessor circuitry 50 and feature extraction circuitry 60. (As referred to herein, the terms "input spoken words," "spoken words," "speech," or the like are intended to generically include any acoustical or electrical representation of communicative sounds. Typically, the circuitry 50 is adapted to receive word communications directly from an individual, or word-representative electrical signals from over a telephone line or tape recorder.) The preprocessor circuitry 50 utilizes a bank of bandpass filters to translate speech into a plurality of spectral component signals on lines 50a. The signals on lines 50a are received by the feature extraction circuitry 60 which generates feature output signals on particular ones of a number of feature output lines 60a, the particular ones depending on the features contained in the speech being received. Signals on the feature output lines may represent, for example, the presence of commonly used vowel or consonant sounds.

In the present embodiment the feature output lines 60 are coupled to word boundary determining circuitry 100 whose output is coupled to processing circuitry, the functions of which are generally shown within the dashed enclosure 70. The circuitry 100, which is the subject of the present invention, includes a "word boundary feature extractor" block 110 and a "word isolator" block 150. This circuitry will be detailed hereinbelow, but for the present it suffices to say that the outputs of circuitry 100 are "isolated" groups of feature signals representative of individual spoken command words in the input.

The processing circuitry 70 receives a group of feature signals and forms a time dependent matrix, this function being represented by the block 71. The matrix members represent the status of each feature signal during the command word; i.e., the matrix indicates the presence or absence of each feature during each time slot of the command word. Before commencing operation, another matrix had been stored in processing circuitry 70, as represented by the block 72. This "training word" matrix has members which represent the status of the feature signals that are expected to occur characteristically during the command word. The two matrices are then compared, this function being represented by the block 73. The comparison is preferably performed on a member-by-member basis and results in a determination of the degree of correlation between the two matrices. If the degree of correlation is sufficiently high, the processing circuitry generates an indication that the command word has been recognized. For multiple word vocabularies, a matrix is stored for each training word comprising the vocabulary.

Figure 2A:
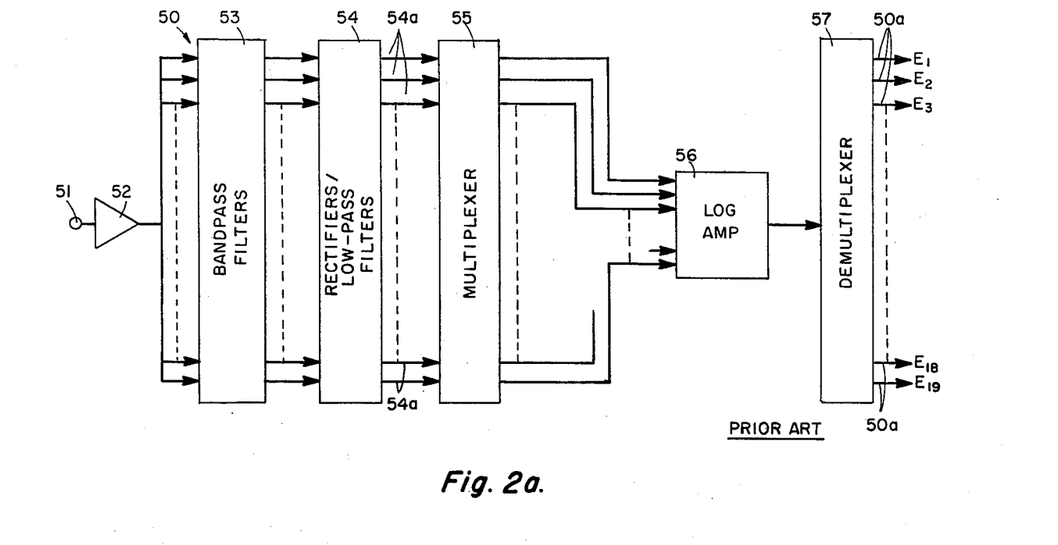
FIGS. 2A and 2B are block diagrams of prior art circuitry useful as a feature extractor means in the invention with the FIG. 2A illustrating the preprocessor circuitry 50 of FIG. 1 and the FIG. 2B illustrating the feature extraction circuitry 60 of FIG. 1.
Figure 2B:
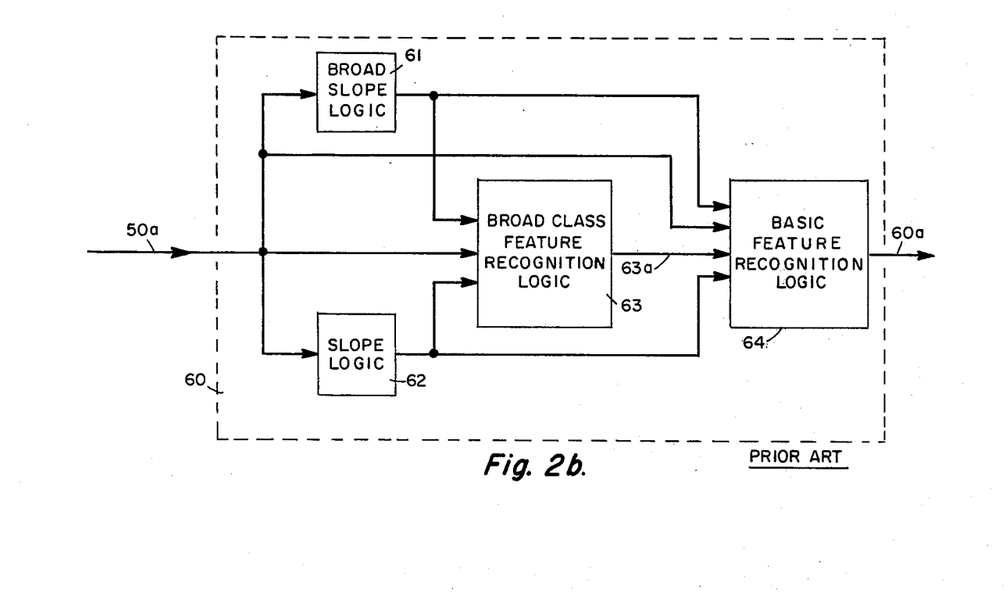

FIG. 2 illustrates, in some further detail, prior art feature extraction means which is of the type that is suitable for use as the feature extraction means 10 of FIG. 1. A full description of both the preprocessor circuitry 50 and the feature extraction circuitry 60 can be found in a publication entitled "Acoustic Recognition of A Limited Vocabulary of Continuous Speech" by T. B. Martin and published by University Microfilms, Ann Arbor, Michigan. It should be emphasized, however, that the present invention deals largely with already-processed feature signals and any suitable means for obtaining the feature signals can be employed. Accordingly, the extent of detail set forth herein is limited to that needed to facilitate understanding of the portions of the apparatus through inventive.

FIG. 2A is a block diagram of the preprocessor circuitry 50. A transducer 51, typically a gradient microphone, receives input spoken words and produces time-varying electrical signals that are representative of the received sounds. The output of transducer 51 is coupled, via preamplifier 52, to nineteen contiguous bandpass filters in a filter bank 53. Each filter in the bank produces an output signal related to that portion of the input signal which lies in the range of frequencies passed by the particular filter. Typically, the filter center frequencies range from about 250 to about 7500 Hz with the lowest filter bandwidth being about 150 Hz.

The output of each filter in the bank 53 is individually coupled to a full wave rectifier and lowpass filter bank 54. After rectification and filtering, the outputs of the bank 54 essentially represent the energy levels of the input signal at about the center frequencies of each of the bandpass filters in the bank 53. Viewed in another way, the signals on lines 54a collectively represent the envelope of the energy vs. frequency spectrum of the received input signal taken over the frequency range of interest.

The nineteen channels of information on lines 54a are logarithmically compressed to produce the spectral component outputs on lines 50a of the preprocessor. Logarithmic compression facilitates subsequent processing in two ways. First, it provides dynamic range compression that simplifies the engineering design requirements of feature extraction circuitry 60. Secondly, by virtue of using logarithms, comparative ratios of the spectral component signals can be readily computed by subtraction. Ratios are desirable processing vehicles in that they are independent of changes in overall signal amplitudes. This property is particularly advantageous in a system where input speech of varying loudness is to be recognized.

In the diagram of FIG. 2A, a single log amplifier 56 is time shared to avoid the necessity of using nineteen identical amplifiers to achieve compression. The outputs on 54a are effectively sampled by a multiplexer 55 and the sampled signals passed, one at a time, through the shared amplifier 56. A demultiplexer 57 then "reconstructs" compressed spectral component signals on lines 50a from the processed sampled signals. The sampling clock rate of the multiplexer and demultiplexer is above one kHz and is safely higher than is necessary to retain signal bandwidths. This technique of sharing a single logarithmic amplifier is known in the art and is disclosed, for example, in U.S. Pat. No. 3,588,363 of M. Herscher and T. B. Martin entitled "Word Recognition System For Voice Controller" as well as in the above-referenced publication of T. B. Martin. The spectral component signals on lines 50a are designated $E_1, E_2, E_3 \ldots E_{19}$ and can be visualized as representing the logarithms of the energy in the characteristic frequency bands of filters 53.

It will be recalled that the spectral component signals on lines 50a are entered into the feature extraction circuitry 60 (FIG. 1) which senses the presence of properties of the spectral component signals that correspond to preselected properties or "features" of input words. In the prior art feature extraction circuitry being described for illustration, this sensing of properties or "feature extraction" is achieved in part by deriving energy sums and quantities known as "slope" and "broad slope" characteristics. These quantities give indication as to the polarity and magnitude of the slope of the input envelope when taken over specified segments of frequency spectrum. The manner in which these quantities are obtained is described in the above-referenced publication and patent.

FIG. 2B shows a simplified block diagram of the prior art feature extraction circuitry 60 which receives the spectral component signals on the lines 50a. The circuitry 60, which is also described in the referenced publication and patent, includes logic blocks 61 and 62 which derive sets of slope and broad slope quantities that are received by a "broad class feature" recognition logic block 63. The block 63 utilizes groups of operational amplifiers and appropriate peripheral circuitry to generate broad class feature signals 63a that indicate the presence of certain broadly classified phonetic characteristics in the input words. Examples of the broad classifications are "vowel/vowel-like," "voicing only," "burst," "voiced noise-like consonant," etc. The signals 63a as well as the spectral component signals, slope, and broad slope signals are received by a "basic feature" recognition logic block 64. This block, which includes components that are similar in nature to the block 63, functions to generate the feature signals that indicate the presence of specific acoustic features of the input spoken words. It should be emphasized, however, that the invention to be described is not limited to any particular form of feature signal generation.

Figure 3:
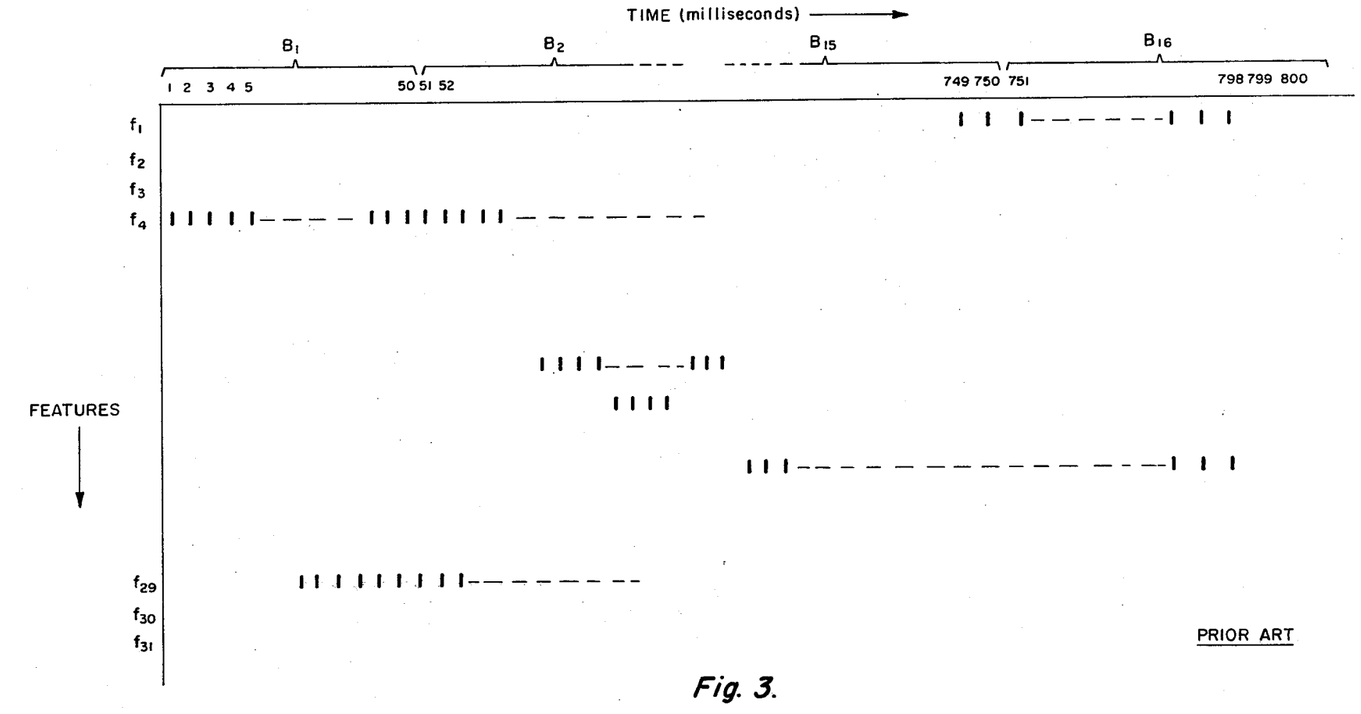
FIG. 3 illustrates the type of matrix that results from the storing of binary features by processing circuitry of FIG. 1.

FIG. 3 illustrates the operation of processing circuitry 70 by showing the type of matrix that results from storing the status of the binary features which occur during the command word. In the present embodiment thirty one binary feature signals, hereinafter sometimes designated $f_1$ through $f_{31}$, are derived on 31 feature output lines 60a and continuously indicate the presence or absence of specific features. In the example of FIG. 3 it is assumed, for purposes of illustration, that the input word had a time duration of 800 milliseconds. This means that the resultant matrix has dimensions of 31 × 800. In other words, it records the presence or absence of each of 31 features over 800 sampled "time slots," each time slot being 1 millisecond long. As is seen from the representative 1's of the FIGURE (inserted arbitrarily for illustration), different features occur for varying portions of the word duration with a particular feature usually being "on" continuously for a number of milliseconds. The absence of a 1 in a matrix position implies a 0; i.e., the absence of the feature.

Figure 4:
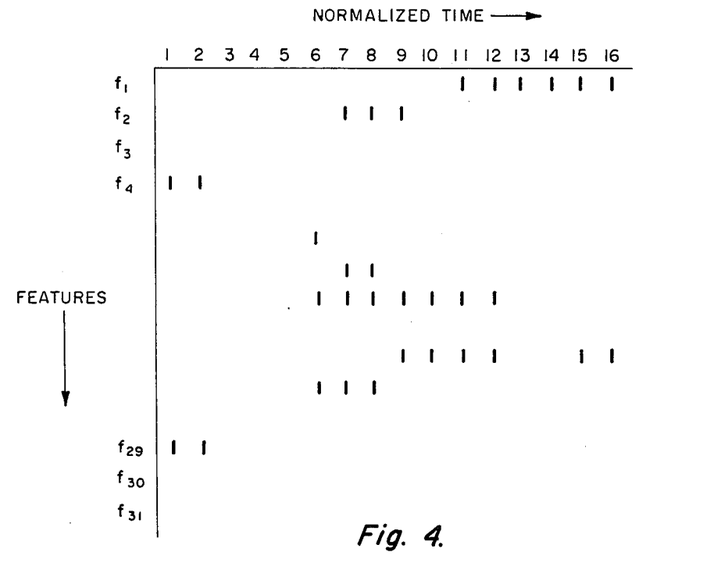
FIG. 4 illustrates a time normalized matrix.

The time normalization function, performed by circuitry 70, reduces each input word matrix to a 31 × 16 matrix, the time axis being reduced down to 16 normalized time slots. The normalization can be performed in a number of ways, one technique involving the selection of the normalized time periods which include a majority of 1's. The arithmetic process for carrying out this technique is quite straightforward, basically involving simple division and counting. To illustrate, in the example of FIG. 3 the 800 time slots for each feature would be divided into groups of 50 as shown by the brackets labeled $B_1$ through $B_{16}$. Each bracket contains 50 time slots so, in this example, a particular normalized time slot for a feature will be assigned a 1 if the bracket contains at least 26 1's. In FIG. 3, the feature $f_1$ has a majority of 1's in the time includes in bracket $B_{16}$. Therefore, the 16th and last normalized time slot for $f_1$ will contain a 1. An entire 31 × 16 normalized matrix is formed in this manner by examining the count of ones under each of 16 brackets for each of the 31 features. In the example given, the overall time is an exact multiple of 16, but if this is not the case, any remainder is distributed among the brackets in a specified manner. For example, if there had been originally 803 time slots (milliseconds), then each of the first three brackets would have included 51 milliseconds rather than 50, the remainder of the brackets including 50 milliseconds. FIG. 4 illustrates a typical normalized matrix for a command word candidate with the 1's again being shown and 0's being implied by the absence of a 1 at a matrix position.

A detailed description of the operation of suitable processing circuitry 70, in the form of a properly programmed general purpose computer, is set forth in the above-referenced copending application Ser. No. 531,543. As indicated, a time normalized matrix is formed for the command word. Before commencing operation, another time normalized matrix of this same type had been stored in the computer, as represented by the block 72. This previously stored matrix has members which represent the status of feature signals that are expected to occur characteristically during the command word and can be formed, for example, during a "training" period, as set forth in the referenced copending application. The two matrices are then compared to determine the degree of correlation therebetween, as discussed above and in detail in the referenced copending application. It should be emphasized, however, that the present invention is applicable to any processing circuitry 70 which can compare the feature signals that occurred during the specified interval with a stored set of expected features, so the invention is not limited to any particular processing circuitry 70.

The word boundary determining circuitry of FIG. 1 will be recalled as including a "word boundary feature extractor" block 110 and a "word isolator" block 150. The circuitry in block 110 operates to extract particular features that are needed for the boundary determinations and is shown as being separate from the main feature extractor 60 for illustrative clarity. It will be understood, however, that the block 110 may typically be a part of a single feature extraction module and that the features extracted thereby can find use in other phases of the recognition process in addition to boundary determination.

Figure 5:
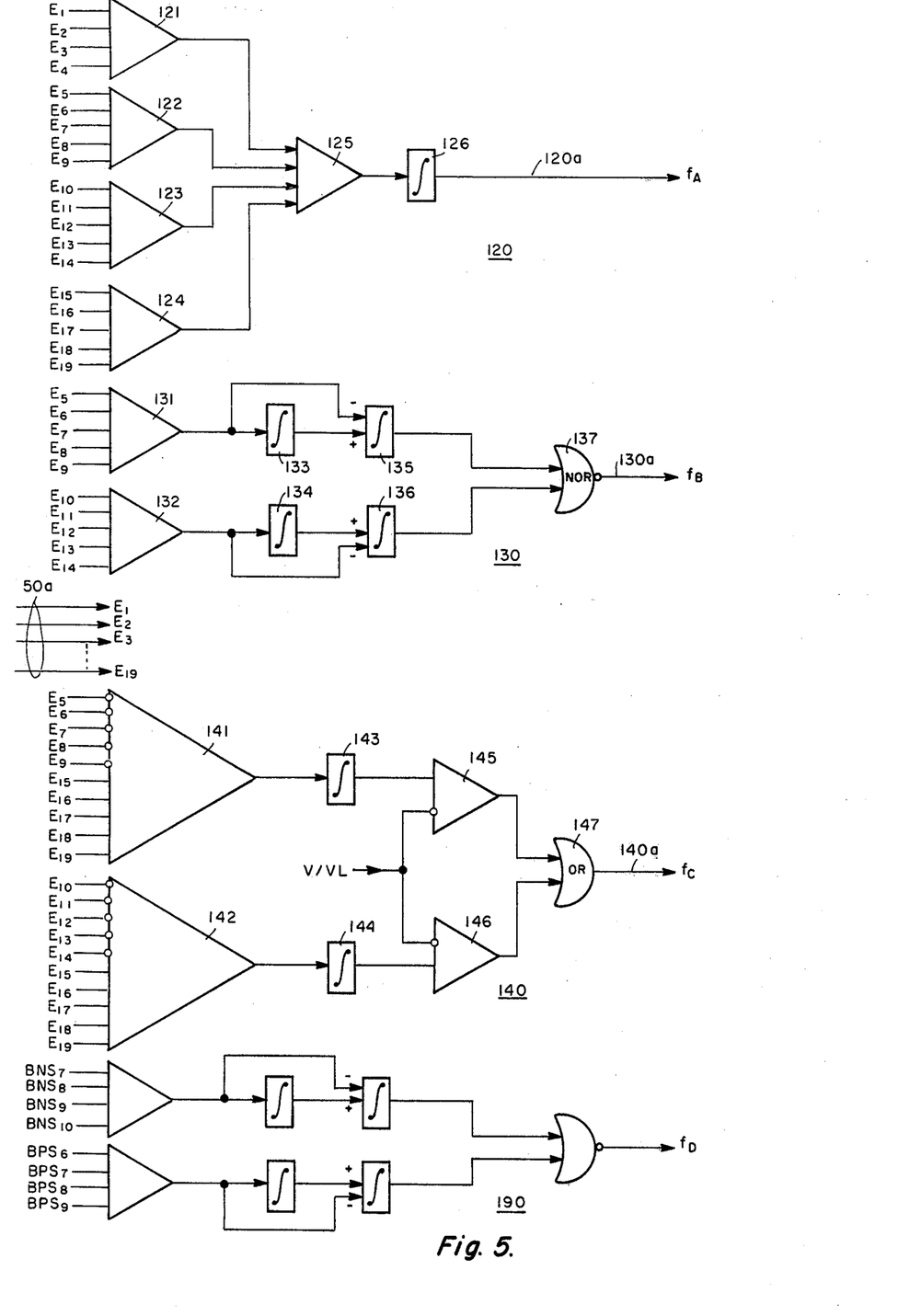
FIG. 5 is a block diagram of the word boundary feature extractor of FIG. 1.

Referring to FIG. 5, there is shown a block diagram of the word boundary feature extractor 110. As previously indicated, the spectral component signals 50a, i.e., $E_1, E_2, \ldots E_{19}$, are available as inputs to the feature extractor 60 (FIG. 1), and these signals are also made available to the word boundary feature extractor 110, as shown in FIG. 5 and as represented diagramatically by the lines 60B in FIG. 1. For clarity of illustration, the interconnections of these signals to the circuitry of FIG. 5 are not shown, it being understood that they are each available as inputs either directly from the preprocessor circuitry 50 or via the feature extraction circuitry on lines 60B. The FIG. 5 shows operational amplifiers of a type known in the art and used for feature extraction, the operational amplifiers being adapted to receive "excitatory" inputs as well as "inhibitory" inputs and to provide an analog output that is proportional to the amount by which the sum of the amplitudes of signals at the excitatory inputs exceed the sum of amplitudes of signals at the inhibitory inputs.

In FIG. 5, a circuit 120 is utilized to extract a feature designated $f_A$ which appears on line 120a and serves as a "rough" speech detector in the present embodiment. Four operational amplifiers designated 121, 122, 123 and 124 each receive as excitatory inputs specified ones of the spectral component signals 50a. Amplifier 121 forms the sum of $E_1$ through $E_4$, amplifier 122 forms the sum of $E_5$ through $E_9$, amplifier 123 forms the sum of $E_{10}$ through $E_{14}$ and amplifier 124 forms the sum of $E_{15}$ through $E_{19}$. The outputs of these four amplifiers are coupled to excitatory input terminals of another operational amplifier 125. The output of amplifier 125 is therefore seen to be a measure of the presence of a predetermined amount of energy in groups of the spectral component signals covering the acoustic spectrum of speech under consideration. When the energy sum representative of a portion of the spectral region exceeds a predetermined threshold, the operational amplifier 125 produces an output. An integrator circuit 126 receives the output of amplifier 125 and is provided with appropriate time constants such that its output rises almost immediately upon sensing an output of operational amplifier 125, but does not turn off until there has been no outputs from amplifier 125 for a substantial period, for example 100 ms. This provision for "hysteresis" is necessary to prevent the rough speech feature $f_A$ from disappearing during a natural pause in a spoken word. Absent the hysteresis, the rough speech detector would interpret the first part of a word containing a pause as an entire word.

The circuits 130 and 140 are used to extract features designated $f_B$ and $f_C$, respectively, which applicants have found to characterize the termination of spoken words. These two features are of such a nature that they will not be found to occur during breath noise and are unlikely to occur in background noise. The circuit 130 includes an operational amplifier 131 which receives excitatory inputs $E_5$, $E_6$, $E_7$, $E_8$ and $E_9$ and an operational amplifier 132 which receives as excitatory inputs $E_{10}$, $E_{11}$, $E_{12}$, $E_{13}$ and $E_{14}$. The output of amplifier 131 is coupled to integration circuit 133 whose output is, in turn, coupled to another integration circuit 135. The output of amplifier 131 is also coupled directly to a negative input terminal of integration circuit 135, so that this integrator operates on the difference between the output of integrator 133 and the output of amplifier 131. Integration circuits 134 and 136 are connected in the same manner to receive the output of amplifier 132. The outputs of integration circuits 135 and 136 are inputs to NOR gate 137 whose output, which appears on line 130a, is the extracted feature, $f_B$, which indicates, inter alia, the presence of a voiced phonetic characteristic in the input speech. The feature $f_B$ is seen to be a function of threshold energy in the sum $E_5$ through $E_9$ or in the sum $E_{10}$ through $E_{14}$ (bearing in mind that we are dealing with logarithms, so that a product of energies over the frequencies of interest is actually determined). The integrators 133 and 134 are provided with time constants which are about fifteen times as great as the time constants of the integrators 135 and 136. Thus, the inputs to NOR gate 137 reflect the difference between a relatively long term integration and a relatively short term integration. The relatively fast drop-off of energy in either of the spectral component energy bands causes a logical 1 input to NOR gate 137 which, in turn, causes $f_B$ to go to zero.

The circuit 140 includes an operational amplifier 141 which receives the signals $E_5$ through $E_9$ as inhibitory inputs and the signals $E_{15}$ through $E_{19}$ as excitatory inputs. Also, operational amplifier 142 receives the signals $E_{10}$ through $E_{14}$ as inhibitory inputs and the signals $E_{15}$ through $E_{19}$ as excitatory inputs. The outputs of the amplifiers 141 and 142 are respectively coupled to integration circuits 143 and 144, each of which is provided with a time constant of the order of 10 milliseconds, these integrators serving to prevent loss of the output feature during short pause intervals. The output of integration circuits 143 and 144 are respectively coupled to excitatory inputs of operational amplifiers 145 and 146. These amplifiers also have inhibitory inputs which receive a signal designated as "V/VL" which stands for "vowel/vowel-like." The V/VL feature, known in the art, is derived based on various energy band ratios indicative of the expected format positions of different vowels as described in the abovereferenced publication of T. B. Martin. The outputs of amplifiers 145 and 146 are coupled to OR gate 147 whose output, on line 140a, is the extracted feature $f_C$ which detects the presence of an unvoiced noise-like consonant in the input speech. As can be seen from the circuit 140, the feature $f_C$ basically detects a greater sum of energy values in the higher frequency channel bands relative to the lower frequency channel bands. Since certain vowels or vowel-like sounds also have this property, the V/VL feature is used to inhibit false indications of the unvoiced noise-like consonant feature.

Figure 6:
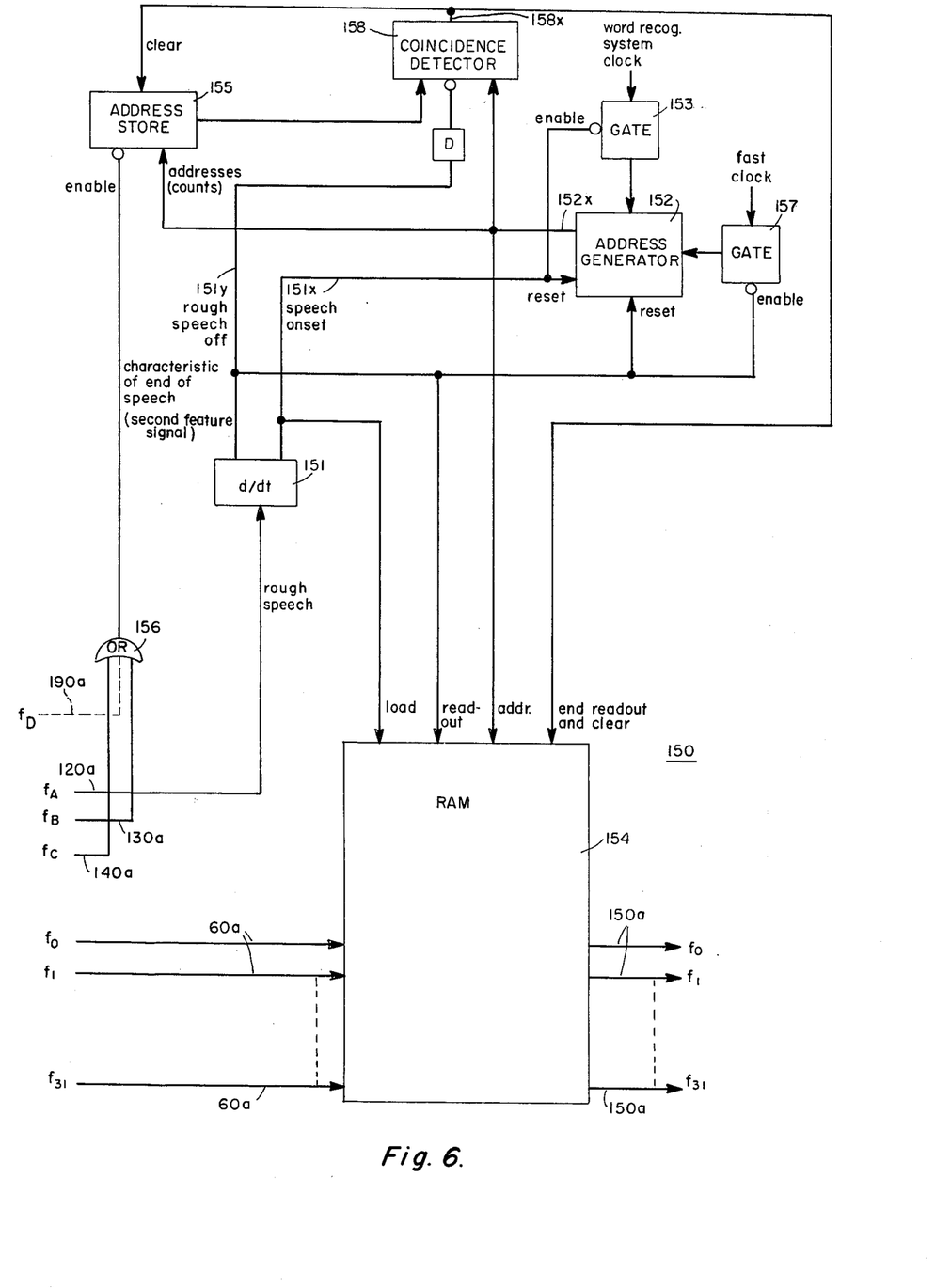
FIG. 6 is a block diagram of the word isolator of FIG. 1.

Referring to FIG. 6, there is shown a block diagram of the word isolator 150. Generally, the word isolator operates to store the feature signals that occur on feature output lines 60a during a spoken word and then to couple the stored features to circuitry 70 (FIG. 1), the features read out of the word isolator being complete words whose boundaries have been defined. In the present embodiment, the time of occurrence of certain feature events in the input speech are noted and subsequently used to determine the limits of information read out of the word isolator 150.

The feature output line 120a is coupled to a differentiator circuit 151 which detects the onset or the offset of feature $f_A$. A speech onset causes an output signal on the line 151X, whereas the end of speech (roughly determined) causes an output of line 151Y. The signal on line 151X resets an address generator 152, which may be a digital counter, and enables a gate 153 which, in turn, passes clock signals that step the address generator using the basic clock from the word recognition system (see e.g. description pertaining to FIG. 2). The address generator feeds addresses to a random access memory (RAM) 154 over a line 152X, the addresses being stepped at the basic clock rate of the word recognition system which may be, for example, a 1 kHz clock rate. The signal on line 151X also initiates the loading of memory 154. Thus, the status of each of the 31 feature signals $f_0$ through $f_{31}$ is stored at a first address (which would include 31 bits of memory), the status of the 31 feature signals $f_0$ through $f_{31}$ one millisecond later would be stored at the second address, and so on. The addresses on line 152X are made continuously available to an address storage circuit 155 which is enabled by the presence of a signal on either of the feature lines 130a or 140a by operation of an OR gate 156. Each time the address storage circuit 155 is enabled, it erases its previously stored address and restores the latest address. In this manner, the address storage circuit 155 keeps a running record of the latest times at which a signal has occurred on either the line 130a (feature $f_B$) or the line 140a (feature $f_C$).

Operation continues in the described manner until the termination of a signal on the line 120a (feature $f_A$) causes differentiator 151 to generate a signal on line 151Y. The signal on line 151Y resets the address generator and enables a gate 157 which, in turn, passes relatively high frequency clock signals that step the address generator 152 at a relatively fast rate, for example 1 mHz. The signal on line 151Y also serves to enable a coincidence detector 158 via a short delay, D. The coincidence detector receives as its two inputs the address stored in address storage circuit 155 and the current address from address generator 152 on line 152X. Also, the signal on line 151Y initiates the readout of the information stored in random access memory 154, the readout being controlled by addresses on line 152X which are, as indicated, now being stepped at the fast clock rate. The readout continues until the address generator 152 reaches a count that coincides with the count that had been stored in address storage circuit 155, whereupon the coincidence detector issues a signal on line 158X that terminates readout from the random access memory 154, and clears both the memory 154 and the address storage memory 155.

Thus, it is seen that the feature signals of a received spoken word are read out of random access memory 154 in the order received, but the last group of 31 feature signals to be read out is determined by the last occurrence of $f_B$ or $f_C$ during the input spoken word. In this manner, the circuitry 100 serves to "back-up" the end boundary of a given spoken word, the amount of "back-up" being variable and depending upon the last occurrence of certain identifiable features of the input spoken word. When the feature signals on lines 150A are received by circuitry 70, the matrix formation routine (block 71) can be readily adapted to accept isolated words having at least some minimum duration (to avoid having extremely short sounds be interpreted as spoken words). In the alternative, the final count stored in the address storage circuit 155 could be readily interrogated to determine whether a received spoken word was of the minimum required duration.

The graphs of FIG. 7 facilitate understanding of the operation of the invention. Graph 7A represents the sound energy of a spoken word which initiated at about a time $t_1$ and ended at about a time $t_2$, it being assumed that the speaker emitted post-word breath noise after completing the word, the breath noise continuing until a time $t_3$. Graph 7B illustrates the type of output obtained from a rough speech boundary determiner working over the broad spectral energy range with hysteresis, such as the feature $f_A$. It is seen that the feature turns "on" very soon after the onset of the spoken word; i.e., at a time that can be considered substantially as $t_1$. The feature persists for the duration of the sound energy ($t_3$) and continues until the time $t_4$ due to the inherent hysteresis associated with the $f_A$ feature, This inherent lag time is designated by $h$. In graph 7C, there is illustrated the type or word boundary determination that could be obtained by backing up the fixed time $h$ from the end of the rough speech determination feature $f_A$. This results in a word boundary determination of approximately $t_1$ to $t_3$; i.e., a boundary determination that incorrectly includes the breath noise as part of the spoken word.

Figure 7A:
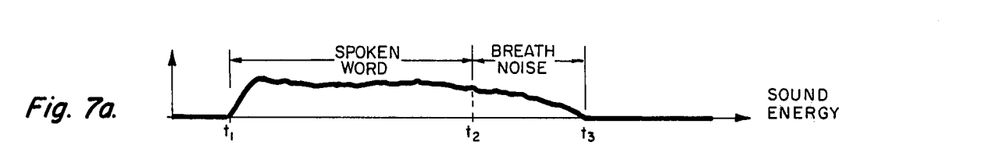
FIGS. 7a –7e shows a group of graphs helpful in understanding operation of the invention.
Figure 7B:
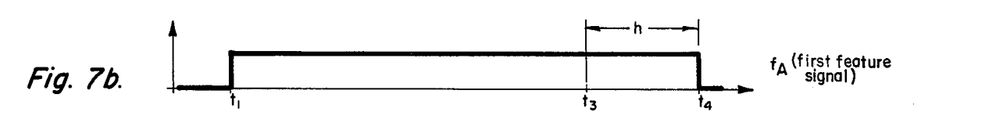
Figure 7C:
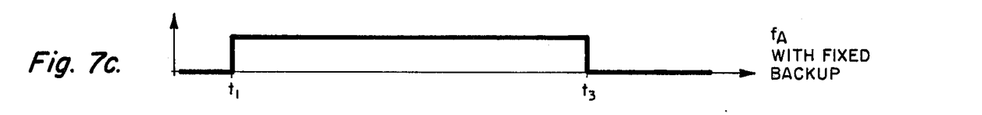
Figure 7D:
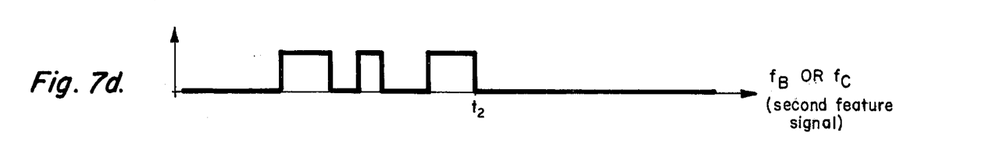
Figure 7E:
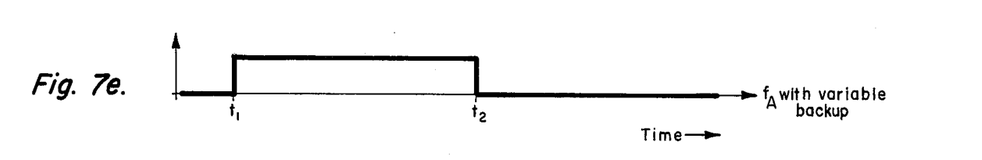

Graph 7D shows the logical function $f_B$ OR $f_C$ which could typically be expected as the output of OR gate 156 (FIG. 6) for the spoken word under consideration. Depending on the characteristic features of the word, the specific features $f_B$ or $f_C$ might occur at times during the word or continually during the word, but the important thing is that $f_B$ OR $f_C$ is found to virtually always be present at the spoken word termination, while not being present in breath noise. Accordingly, the function shown in graph 7D is seen to turn "off" for the last time approximately simultaneously with $t_2$. Thus, the word boundary determined by the circuitry of FIG. 6 is as shown in graph 7E; viz., a boundary which starts at $t_1$ and persists until the last occurrence of $f_B$ or $f_C$ before the end of $f_A$, that is until the time $t_2$.

The invention has been described with reference to a particular embodiment, but variations within the spirit and scope of the invention will occur to those skilled in the art. For example, while the described embodiment stresses a variable word boundary back-up at the end of a word, it should be understood that the same type of technique can be utilized at the beginning of a word. This could be done, for instance, by providing a second address storage and coincidence detector in the circuitry of FIG. 6, these additional circuits being used to detect the first address at which word boundary features are found present (as well as determining the last occurrence as described). Also, it will be recognized that a fixed back-up can be employed, if desired, in conjunction with and in addition to the variable effective back-up described herein. Further, it will be recognized that the effective back-up could be achieved by storing features in a shift register or any suitable memory means as an alternative to the the random access memory disclosed herein. It should also be noted that the RAM 154 could readily be part of the circuitry 70 or that, in general, the functions of FIG. 6 could be achieved, at least in part, using software implementations. Finally, it will be recognized that the feature signals $f_B$ and/or $f_C$ used in determining the ultimate word boundary (i.e., the output of OR gate 156) can be supplemented with additional features found to characterize speech of a particular vocabulary and to be generally absent from extraneous sounds such as breath noise. For example, FIG. 5 shows a circuit 190 which generates a feature designed $f_D$ and called "inverse slope gap." This circuit is of the same general structure as the circuit 130, except that the excitatory inputs of the two operational amplifiers are the Broad Negative Slopes ("BNS") $BNS_7$ through $BNS_{10}$ and the Broad Positive Slopes ("BPS") $BPS_6$ through $BPS_9$. The BNS and BPS quantities are derived from the spectral component signals by the broad slope logic 61 (FIG. 2B) as described in detail in U.S. Pat. No. 3,821,472. The resultant feature, $f_D$, is characteristic of word terminations which end in slowly decaying energies; e.g., the word "amen." The use of $f_D$, as an additional input to OR gate 156 of FIG. 6, would accordingly prevent premature boundary determination for this type of vocabulary word.

We claim:

1. In an apparatus which recieves acoustic input, said input including words spoken in isolation, and performs recognition functions on said words, said apparatus including means for generating feature signals indicative of feature characteristics in the received input and means for comparing the feature signals which occur during determined time boundaries with stored features corresponding to words in a vocabulary; an improved system for detecting word boundaries, comprising:
   a. means responsive to said input for generating a first feature signal indicative of the presence of speech-like sounds which meet a first selection criterion;
   b. means for storing the feature signals which occur during the presence of said first feature signal;
   c. means responsive to said input for generating a second feature signal indicative of the presence of speech-like sounds which meet a second selection criterion; and
   d. means for determining the substantially last occurrence of said second feature signal among the stored feature signals, the end boundary of an input spoken word being determined as a function of said last occurrence.

2. The system as defined by claim 1 wherein said second selection criterion is more restrictive than said first selection criterion.

3. The system as defined by claim 2 wherein said first feature signal is provided with a predetermined delay in its turn-off characteristic.

4. The system as defined by claim 1 wherein said means for generating said second feature signal includes means responsive to said input for generating an indication of the presence of a voiced phonetic characteristic in said input.

5. The system as defined by claim 1 wherein said means for generating said second feature signal includes means responsive to said input for generating an indication of the presence of an unvoiced noise-like consonant characteristic in said input.

6. The system as defined by claim 1 wherein said means for generating said second feature signal includes means responsive to said input for generating an indication of the presence of a voice phonetic characteristic or an unvoiced noise-like consonant characteristic in said input.

7. The system as defined by claim 3 wherein said means for generating said second feature signal includes means responsive to said input for generating an indication of the presence of a voiced characteristic or an unvoiced noise-like consonant characteristic in said input.

8. The system as defined by claim 6 wherein said means for generating said second feature signal further includes means responsive to said input for generating an indication of the presence of a slowly decaying speech energy characteristic in said input.

9. In an apparatus which receives acoustic input, said input including words spoken in isolation, and performs recognition functions on said words, said apparatus including means for generating feature signals indicative of feature characteristics in the received input, and means for comparing the feature signals which occur during determined time boundaries with stored features corresponding to words in a vocabulary; an improved system for detecting word boundaries, comprising:
  a. means responsive to said input for generating a first feature signal indicative of the presence of speech-like sounds which meet a predetermined energy threshold criterion;
  b. means for storing the feature signals which occur during the presence of said first feature signal;
  c. means responsive to said input for generating a third feature signal indicative of the presence of a voiced phonetic characteristic in said input;
  d. means responsive to said input for generating a fourth feature signal indicative of the presence of an unvoiced noise-like consonant in said input;
  e. means for generating a second feature signal as a function of said third and fourth feature signals; and
  f. means for determining the substantially last occurrence of said second feature signal among the stored feature signals, the end boundary of an input spoken word being a function of said last occurrence.

10. A system as defined by claim 9 wherein said first feature signal has a predetermined delay in its turnoff characteristic.

11. In conjunction with an apparatus which receives acoustic input that includes spoken words in isolation and performs recognition functions on said words, the apparatus generating signals indicative of feature characteristics in the received input and comparing signals which occur during determined time boundaries with stored features corresponding to words in a vocabulary; a method for detecting word boundaries, comprising the steps of:
  a. generating a first feature signal indicative of the presence of speech-like sounds which meet a first selection criterion;
  b. storing the feature signals which occur during the presence of said first feature signal;
  c. generating a second feature signal indicative of the presence of speech-like sounds which meet a second more restrictive selection criterion; and
  d. determining the substantially last occurrence of the second feature signal among the stored feature signals, the end boundary of an input spoken word being a function of said last occurrence.

* * * * *

UNITED STATES PATENT OFFICE
CERTIFICATE OF CORRECTION

PATENT NO. : 4,032,710
DATED : June 28, 1977
INVENTOR(S) : Thomas B. Martin, et al.

It is certified that error appears in the above-identified patent and that said Letters Patent are hereby corrected as shown below:

col. 13, line 2 change "voice" to --voiced--.

col. 13, line 8 after "voiced" insert --phonetic--.

Signed and Sealed this

Sixth Day of December 1977

[SEAL]

Attest:

RUTH C. MASON
Attesting Officer

LUTRELLE F. PARKER
Acting Commissioner of Patents and Trademarks